Figure 1:
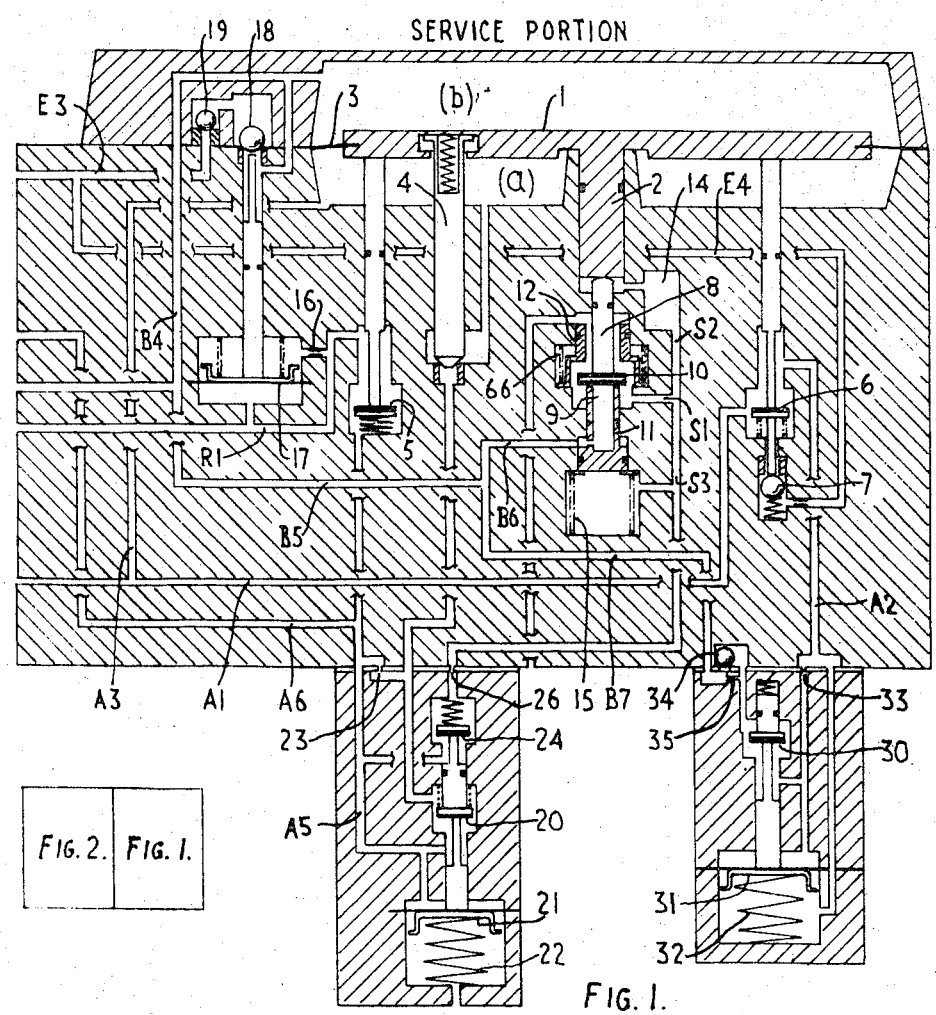

United States Patent [19]
Paginton

[11] 3,731,982
[45] May 8, 1973

[54] FLUID PRESSURE OPERABLE BRAKE CONTROL VALVES

[75] Inventor: Philip Norman Paginton, London, England

[73] Assignee: Westinghouse Brake and Signal Company, Limited, London, England

[22] Filed: May 28, 1971

[21] Appl. No.: 147,749

[30] Foreign Application Priority Data

June 9, 1970  Great Britain.....................27,924/70

[52] U.S. Cl.......................................303/33, 303/37
[51] Int. Cl...............................................B60t 15/22
[58] Field of Search.....................303/33, 37, 39, 43, 303/69, 81

[56] References Cited

UNITED STATES PATENTS 1,895,464    1/1933   Hewitt................................303/37 X
3,472,562   10/1969   Washbourn........................303/33 X

*Primary Examiner*—Duane A. Reger
*Attorney*—Larson, Taylor & Hinds

[57] ABSTRACT

A triple valve for fluid operable braking is provided with an additional emergency braking valve portion which has its own pressure responsive member which is responsive to at least a predetermined reduction of brake pipe pressure relative to quick action chamber pressure in a given period of time to open a brake cylinder valve to apply pressure to the brake cylinder from a reservoir and open a vent valve to vent the brake pipe, the vent valve and the brake cylinder valve being arranged in line and having between them an accelerated release valve which on return movement of the pressure responsive member past its initial position, is allowed to open to connect brake cylinder to brake pipe until the latter are within a predetermined pressure of each other.

5 Claims, 2 Drawing Figures

FLUID PRESSURE OPERABLE BRAKE CONTROL VALVES

This invention relates to fluid pressure operable brake control valve apparatus and relates more especially to an emergency braking control valve operable in response to more than a predetermined rate and amount of change of a controlling fluid pressure to supplement a brake effort controlled by a service valve portion.

According to the present invention there is provided fluid operable brake control valve apparatus for controlling, in response to brake pipe pressure, the supply of fluid under pressure into and out of a brake cylinder, the apparatus including a pressure responsive member mechanically linked to a vent valve and a brake cylinder valve and movable in one direction from a predetermined position in response to a predetermined change of brake pipe pressure in relation to a reference pressure in a given time to on the one hand open the vent valve to vent the brake pipe and thus enhance the change of pressure and on the other hand to open the brake cylinder valve to effect communication between the fluid pressure reservoir and the brake cylinder, the pressure responsive member subsequently being displacable in the other direction to permit reclosure of the said valves and owing to a drop in the reference pressure being responsive to a recovery of brake pipe pressure relative to the reference pressure to permit opening of an accelerated release valve to connect said brake cylinder to said brake pipe.

The vent valve, brake cylinder valve and accelerated release valve may be disposed in line.

The accelerated release valve may be a valve so spring loaded as to function as a check valve to close when the brake pipe pressure has recovered to within a predetermined amount of brake cylinder pressure.

The apparatus may be operable as an emergency braking control valve portion in conjunction with a service braking control valve portion operable to control the application of fluid pressure from an auxiliary reservoir to the brake cylinder in dependence upon the difference between brake pipe and auxiliary reservoir pressures and the said accelerated release valve of the emergency portion may be operable when open to also connect the auxiliary reservoir to the brake pipe.

In the embodiment of the invention about to be described, it may be observed that the vent valve via which the brake pipe is ventable to atmosphere, the high pressure valve via which the emergency reservoir is connectable to the brake cylinder and the accelerated release valve are all arranged in line and this ensures a desired sequence of operation both during emergency application, and during release.

Figure 2:
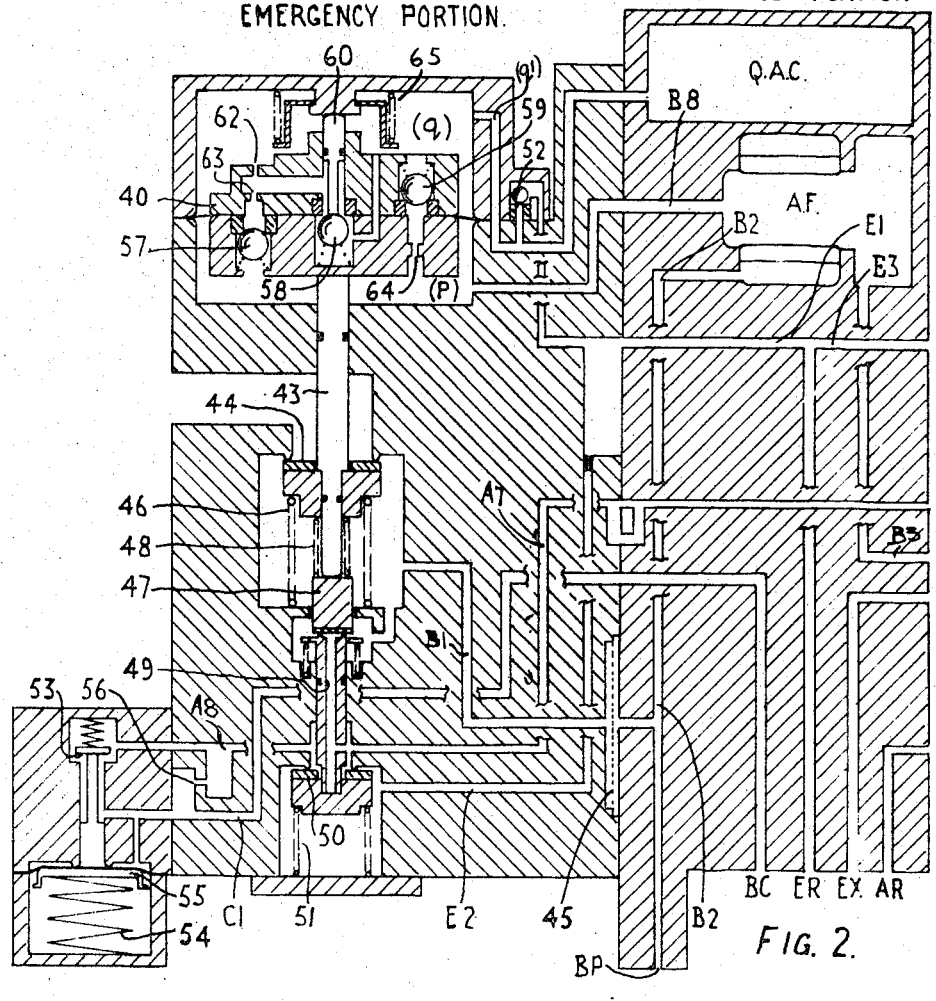

In order that the invention may be more clearly understood and readily carried into effect, the same will be further described by way of example with reference to FIGS. 1 and 2 of the accompanying drawings which together illustrate a control valve comprising an emergency portion, a manifold portion and a service portion and the manner in which these portions are interconnected to constitute one embodiment of the invention as for operation.

Referring to the drawings, the service portion, the manifold portion, and the emergency portion are correspondingly labelled and the manifold portion is provided with ports for connection to the brake pipe (BP), brake cylinder (BC), emergency reservoir (ER), brake cylinder exhaust (EX) and auxiliary reservoir (AR). The brake cylinder, emergency and auxiliary reservoirs are not shown but are assumed to be appropriately connected and as will be seen hereafter, the latter reservoirs are chargeable in the charging mode from the brake pipe (BP). The manifold portion also includes in addition to the various airways to be referred to in greater detail hereafter, an air filter (AF) via which all incoming brake pipe air has to pass before communicating with either of the pressure responsive members in the emergency portion or the service portion of the apparatus. The manifold portion also includes a quick action chamber (QAC) further reference to which will be made hereafter.

Referring now to the service portion, this bears considerable similarity to the brake control apparatus which is described in some detail in the Specifications of co-pending patent applications Ser. Nos. 115,650 and 115,651. Certain detail differences will however become apparent. For example, the accelerated release reservoir of the above-numbered Applications if provided by the emergency reservoir of the present embodiment. Further, associated with the auxiliary reservoir charging valve of the present arrangement, there is a further valve which is operated from the same stem for charging the emergency reservoir. Also, retarded recharge valve means is provided associated with the auxiliary reservoir charging stroke and a service portion inshot valve is provided which is operable to provide an inshot of air to the brake cylinder from the auxiliary reservoir upto a predetermined pressure of say 12 p.s.i. An emergency portion inshot valve is also similarly provided.

The service portion of the apparatus consists essentially of a main pressure responsive member 1 slidably carried on a stem 2 in the housing of the service portion and the pressure responsive member 1 along with its flexible diaphragm 3 constitutes a partition between a chamber (b) which is connected to brake pipe and a chamber (a) which is connected to auxiliary reservoir. The pressure responsive member 1 carries a brake cylinder inlet valve represented by reference 4 and a brake cylinder exhaust valve represented by reference 5 each being operated by the upward or downward movement respectively of the pressure responsive member. Also coupled to the member 1 is the auxiliary reservoir charging valve 6 and associated therewith an emergency reservoir charging valve 7. Finally, the central stem 2 which is sealingly slidable in the housing is coupled via a rod 8 to a quick service and inlet exhaust valve assembly represented generally by the reference 9. The quick service inlet and exhaust valves have a composite closure member 10 which is seatable on the one hand against a lower piston operated slidable member 11 and an upper slidable sleeve member 12. The quick service inlet and exhaust valve structure is the subject inter alia of the first of the aforementioned copending patent applications.

As described previously in this last mentioned copending Application, the arrangement is provided with a quick service bulb capacity 14 which is connected on the one hand to the underside of the stem 2, and on the other hand to the underside of the slidable member 11 which normally rests in the position shown against a housed spring 15.

The brake cylinder exhaust valve 5 has its exhaust side connected via a choke 16 to one side of a pressure responsive member 17 on the other side of which is connected via an unimpeded passage R1 to the exhaust side of the valve 5. The pressure responsive member 17 operates a ball valve 18 on exhausting of the brake cylinder to enable an accelerated release to occur by virtue of a transient transfer of fluid pressure from the emergency reservoir to the brake pipe thereby assisting the release. This is described in more detail in the second of the above-mentioned co-pending patent applications, and the interconnections which are provided inter alia via the further check valve 19 for achieving such operation will not be specifically pointed out further herein. The brake cylinder service inshot valve is shown in the drawings as valve 20 and this is controlled by brake cylinder pressure by means of a pressure responsive member 21 which is spring loaded by a spring 22 to hold the valve 20 in an open position up to brake cylinder pressures of about 12 p.s.i. In the closed position of the valve 20 above such pressures, the passage between the auxiliary reservoir via the valve 4 and the brake cylinder is restricted to that through a choke 23. Also coupled to the body of the inshot valve 23 and actuable by the pressure responsive member 21 there is a brake cylinder maintaining valve 24 via which and choke 26, the brake cylinder is connectable to the quick service bulb capacity 14.

The retarded recharge valve to which reference has already been made, is represented by the valve 30 and this again is operable via a rod by a pressure responsive member 31 and the underside of which is subject, in the position of the service portion shown, to auxiliary reservoir pressure via the auxiliary reservoir charging valve 6. The pressure responsive member 31 is spring loaded on the underside and the upper side is connected to the auxiliary reservoir via the valve 6 through a choke 33. The path to the retarded recharge valve 30 from brake pipe is via a check valve 34 or a choke 35 which is parallel with this check valve.

The emergency portion of the apparatus consists of a pressure responsive member denoted generally by the reference 40 which with a diaphragm 41 provides separation between upper and lower chambers (q) and (p), respectively the upper chamber (q) being connected to the quick action chamber (QAC) referred to previously and the lower chamber (p) is connected via the air filter AF to the brake pipe BP. The pressure responsive member 40 is mounted on a sealingly slidable rod 43 via which on a downward movement it can cause opening of a vent valve member 44 connected between the brake pipe via a coarse filter 45 and atmosphere. The valve 44 is normally biassed into the closed position by a spring 46 and the valve member 44 is also sealingly slidable on an extension of the rod 43 which further engages an emergency accelerated release valve member 47 which is also itself subject to a spring pressure effected by a spring 48 between members 44 and 47. The valve member 47 seats against a slidable valve seat 49 via which when separated from 47 there is a passage between the brake cylinder and the brake pipe. The lower end of the slidable valve seat member 49 is engagable with a high pressure valve closure member 50 which is spring biassed by a spring 51 into the closed position in which it seals a path between the emergency reservoir and the brake cylinder.

A check valve 52 is provided between the quick action chamber and the emergency reservoir as indicated and also associated with the emergency portion there is as mentioned previously an emergency inshot valve which comprises a valve closure member 53 which is maintained in an open condition by the pressure of a spring 54 against a pressure responsive member 55 the member 55 only being displaceable against the spring when the brake cylinder pressure has attained a value of approximately 12 p.s.i. At this value, the valve closure member 53 is closable to restrict the path to the brake cylinder to that which is provided via a choke 56.

In order to secure the desired operation within the emergency portion of the apparatus, there are provided between the chambers (q) and (p), conveniently in the pressure responsive member itself, arrangements of suitably spring loaded check valves and choke means. In the present embodiment, there are three check valves 57, 58 and 59. The valve 58 is the choke varying valve and being centrally located, is liftable off its seat in the position of the member 40 as shown, by a centrally disposed needle 60 located with the housing, to provide a by-pass of a choke 62 via the check valve 57. Again, each of the check valves 57 and 59 has a respective associated choke 63 and 64. As will be seen hereafter, the check valve 59 operates as a quick action chamber charging check valve and the check valve 57 serves as an overcharge dissipation check valve for the quick action chamber (QAC).

Referring now to the operation of the apparatus, it will be understood at the outset, that the apparatus is required to control in response to applied brake pipe pressure, the braking pressure applied from auxiliary and/or emergency reservoirs, to a brake cylinder. The apparatus in the present instance is so designed as to control in response to a reduction of brake pipe pressure, an increase of braking pressure to the brake cylinder and vice versa. RElease of the brakes is therefore achievable by a return of brake pipe pressures to a normal operating brake pipe pressure. Furthermore, the apparatus is specifically designed for use in a vehicle which forms part of a train of further vehicles each having identical sets of braking apparatus connected to a common brake pipe.

Considering therefore the charging operation effected from the brake pipe when the brake pipe is pressurized from a driver's brake control valve, air from the brake pipe enters the apparatus at the port BP, passing via the air way B2 through the air filter AF, passages B3 and B4 to the chamber (b) above the pressure responsive member 1 of the service portion. Brake pipe pressure also flows from the passage B3 via passage B5 into passage B7 and through the sensitivity check valve 34 to the retarded recharge valve 30 the position of which at this time is as shown due to the pressure of the spring 32. There is therefore a flow of air via the valve 30 and the auxiliary reservoir charging choke 33 and the air way A2 to the auxiliary reservoir charging valve 6 which is also in the open position and provides a passage via A1 to the auxiliary reservoir. The pressure in the auxiliary reservoir is also communicated via the air way A3 to the lower side (*a*) of the pressure responsive member 1 of the service portion of the apparatus. By virtue moreover of the fact that auxiliary reservoir pressure is also applied from the passage A2 to the lower side of the pressure responsive member 31 which controls the retarded recharge valve 30, dependent upon the value of the spring 32, the valve 30 can maintain a substantially constant differential across the charging choke 33. This assists uniform charging throughout a train of vehicles connected to a common brake pipe.

Brake pipe air is also applied from the passage B5 referred to above to the passage B6 which is connected to the underside of the quick service valve 10 of the service portion and a passage for brake pipe air is also provided via the coarse filter 45 and the air way B1 to the region beneath the vent valve 44 referred to above. Additionally, air from the brake pipe via the filter AF can flow via the passage B8 to the chamber (*p*) beneath the pressure responsive member 40. Air from the chamber (*p*) then flows via the charging choke 64 and the quick action chamber charging check valve 59 to the quick action chamber via the air way ($q^1$).

Charging of the emergency reservoir which is connected at the point ER of the manifold portion of the apparatus is effected from the auxiliary reservoir via the passage A1 leading to the valve 6, the charging check valve 7, and the airway E4 into the airway E3 connected to the emergency reservoir. It will be appreciated therefore that emergency reservoir pressure is applied via the check valve 19 to the upper side of the accelerated release valve 18 and the emergency reservoir therefore constitutes a source of accelerated release air for the operation of the accelerated release valve.

When the system is fully pressurized and a stable condition exists, the pressure differential which is effective on the pressure responsive member 1 of the service portion due to brake pipe pressure acting over the area of the stem 2 against atmospheric pressure which at this time is present in the quick service bulb 14 due to the quick service exhaust valve being open, maintains the service portion in the position shown. In this position, the valve 5 is in the position shown and the brake cylinders are therefore vented to atmosphere and the accelerated release valve 18 rests in the closed position due to the slight downward thrust provided by the pressure responsive member 17.

Ignoring for the present, the operation of the emergency portion and indeed, assuming that the brake pipe pressure is controlled at a controlled rate such that the emergency portion does not operate, the pressure in the chamber (*b*) above the pressure responsive member 1 of the service portion is reduced and the differential causes the pressure responsive member to rise against the stabilizing pressure of the main stem. Such movement causes the quick service inlet valve 10 to lift from its slidable valve seat which is held down against the housed spring by the brake pipe pressure in the passage B6. Opening of the valve 10 allows brake pipe air to flow into the quick service bulb capacity 14 via passages B5, B6 and S1 and S2 and there is a consequential immediate drop of pressure above the pressure responsive member 1 in the chamber (*b*). The pressure responsive member therefore tends to move up more rapidly and the quick service bulb capacity 14 is sealed off from atmosphere by engagement of the valve member 10 with the slidable valve seat 11. The pressure across the quick service control piston at the lower end of the slidable member 11 then equalizes and this permits the light spring loading beneath it to cause the member 11 to move upwards to its uppermost position. In this position, the quick service inlet valve is not closed because the upward movement of the main stem has carried with it the slidable portion 12 to a point at which the portion 12 engages with its upper stop at which point he valve seat 10 is separated from the slidable member 11. The upward movement of 12 is achieved and maintained by virtue of the bulb pressure acting on the area of the valve plus the sleeve 12, as compared with atmospheric pressure which exists in the quick service bulb exhaust passage.

During the rapid upward movement of the pressure responsive member 1 and the stem 2, the brake cylinder exhaust valve 5, the auxiliary reservoir charging valve 6 and the emergency reservoir charging valve 7 close, followed by the opening of the brake cylinder inlet valve 4. Auxiliary reservoir air therefore flows via the passage A3, the chamber (*a*) beneath the pressure responsive member 1 and the brake cylinder inlet valve 4 to the service inshot valve 20 which is open and therefore this air flows to the brake cylinder via the passages A5, A6, A7, A8, the emergency inshot valve 53 in the open condition, the passage C1 to the brake cylinder BC. As mentioned previously both inshot valves 20 and 53 remain in the open condition until the brake cylinder pressure has attained a pressure of approximately 12 p.s.i. At this point the inshot valves close and reduce the initially large opening to the brake cylinder to a passage which is controlled by the choke 23 associated with the service inshot valve or the choke 56 associated with the emergency inshot valve, as the case may be.

The rise of brake cylinder pressure depends upon the degree of reduction in brake pipe pressure and if the brake pipe reduction is not sufficient to produce the required pressure, the brake cylinder maintaining valve 24 does not close and the connection exists between the quick service bulb 14 and brake pipe and the brake cylinder via passages S2, S3, choke 26, and the valve 24 to the brake cylinder via passage A6 and the emergency portion. Brake pipe pressure is therefore reduced by flow into the brake cylinder until sufficient brake cylinder pressure is produced to deflect the pressure responsive member 21 to close the inshot valve and the brake cylinder maintaining valve.

It is to be understood that the foregoing description of operation assumes that the rate of reduction of brake pipe pressure is insufficient to deflect the pressure responsive member 40 of the emergency portion, the quick action chamber pressure flowing back into the brake pipe via the choke 63 and the check valve 57 causing the pressure differential across the pressure responsive member to not be sufficient to deflect the member 44 against the spring 46.

Release after a service application as indicated above, is effected by the drivers brake valve producing a recovery of brake pipe pressure towards the normal steady value. If therefore the brake pipe pressure is so increased, a pressure differential is produced across the pressure responsive member 1 of the service portion of the apparatus to cause a downward force which is resisted by the upward force of brake pipe pressure in the bulb capacity 14 on the quick service valve member 10 and the underside of the stem 2. As soon as this force is overcome, the pressure responsive member moves downwards and the sleeve member 12 of the quick service valve arrangement descends until it reaches its lowest stop by which time the valve closure member 10 is in engagement with the slidable sleeve 11 so that the quick service inlet valve is closed before the quick service exhaust valve is opened. This ensures that during the releasing operation, there is no communication in the quick service valve arrangement between the brake pipe, the quick service bulb capacity and atmosphere. Further increase in the pressure difference across the diaphragm is thus effected by exhausting of the bulb pressure under the stem 2 and such increase in pressure differential causes rapid downward movement of the pressure responsive member to open the brake cylinder exhaust valve 5, the auxiliary reservoir charging valve 6, and the emergency reservoir charging valve 7. Releasing brake cylinder air flows to atmosphere via the airway A6, the valve 5 and the exhaust passage R1. The exhaust pressure in the passage R1 operates beneath the pressure responsive member 17 of the accelerated release valve 18 and the member 17 therefore temporarily moves upwards to provide a communication between the emergency reservoir whose pressure is above the valve 18 and the brake pipe. By virtue of the choke 16, the pressure after a short interval equalizes across the pressure responsive member 17 and the valve 18 recloses. Operation of the accelerated release valve 18 for this brief interval assists the rapid propogation of a brake release along a train by the flow of emergency reservoir air into the brake pipe augmenting increase of brake pipe pressure from the drivers brake valve.

It will be further noted that since the pressure in the quick service bulb capacity 14 is now vented via the quick service vent valve 10, the bulb pressure beneath the piston of the slidable sleeve 11 falls and the piston is held against the housed spring 15 in the position shown in the drawing. The release position is thus regained in which the pressure responsive member 1 and the components beneath it are urged downwards against this housed spring by the resultant of brake pipe pressure in the chamber (b) over the area of the stem 2 against atmospheric pressure in the quick service bulb 14.

The operation has been described so far on the assumption that the rates of change of brake pipe pressure have been only sufficient to cause operation of the service portion of the apparatus but if the brake pipe pressure is rapidly dropped as for an emergency brake application, the reduction of brake pipe pressure effective in the chamber (p) beneath the pressure responsive member 40 of the emergency portion of the apparatus is more rapid than can be compensated for by flow of air via the choke 63 and the check valve 57. The upward force of brake pipe pressure in the passage B1 and the force of the spring 46 beneath the vent valve 44 is therefore overcome and the pressure responsive member moves downwards to open the vent valve 44. The brake pipe pressure is therefore rapidly vented to atmosphere via the passage B1 and the open valve 44.

The pressure responsive member and stem 43 continue to move downwards to fully open the high pressure valve 50 to connect the emergency reservoir via the passage E2 to the emergency inshot valve 53, the open condition of which permits this emergency reservoir air to be applied directly to the brake cylinder at BC.

It will be appreciated moreover that the action of brake pipe pressure also enables the service portion described above, to operate in the manner of a service application and supply air from the auxiliary reservoir to the brake cylinder. Under an emergency application therefore the auxiliary reservoir air is supplemented by emergency reservoir air to effect a rapid application. Also, the operation of the emergency portion can be arranged to provide a 20 percent (say) increase in the pressure in the brake cylinder as compared with that which is produced for a given reduction of brake pipe pressure purely by the service portion.

As mentioned previously, the inshot valve 53 is arranged by virtue of the spring pressure of the spring 54 and the dimensioning of the pressure responsive member 55 to remain open until brake cylinder pressure attains approximately 12 p.s.i. The build up of air in the brake cylinder for an emergency application is therefore very rapid to begin with following sufficiently rapid drop of brake pipe pressure until the point at which the valve 53 closes. After this time a build up of brake pipe pressure is governed by the choke 56.

Downward movement of the pressure responsive member 40 of the emergency portion causes the valve ball 58 to lift off the needle 60 so that the choke 63 is no longer bypassed via the valve 58 and the flow of air between the chambers (q) and (p) on either side of the pressure responsive member can only pass via the chokes 62 and 63 in series with the check valve 57. This enables a clean and rapid function such that the vent valve 44 is held open for a prolonged time until the quick action chamber pressure falls to a lower value at which the spring 46 can reclose the vent valve 44 and also permit the high pressure valve 50 to close interrupting the communication between brake cylinder and emergency reservoir.

The sequence of events during a brake release operation following a rapid reduction of brake pipe pressure which has given rise to operation of the emergency portion as described above may now be considered. When the brake pipe pressure is recharged, it is effective in the chamber (p) to permit upward movement of the pressure responsive member 40 against the housed spring 65 shown above it. This permits the emergency accelerated release valve 47 to lift off its seat provided on the sliding member 49 and thereby provides a path from on the one hand the brake cylinder and on the other hand the auxiliary reservoir via the open brake cylinder inlet valve 4 of the service portion to flow to the brake pipe via passages A7 and A8. An accelerated build up of brake pipe pressure is thereby effected and since the auxiliary reservoir pressure is thereby also reduced the service portion operates to a release condition at an earlier instant in time since brake pipe pressure is required to recover to a lower pressure to effect movement of the pressure responsive member 1. The emergency accelerated release valve 47 in conjunction with its spring 48 operates as a check valve such that it recloses when the auxiliary reservoir and brake cylinder pressures have attained values within approximately 10 p.s.i. of the brake pipe pressure. Subsequently, the pressures in the chambers (p) and (q) move towards one another by virtue of the choke 64 and check valve 59 and the member 40 returns to a position as shown in the drawing. It will be appreciated that a substantial reduction of auxiliary reservoir pressure is experienced during an emergency operation and recharging of the auxiliary reservoir is effected as described previously via the service portion auxiliary reservoir charging valve and the retarded recharge valve 30 affords a controlled recharge by enabling a fixed pressure differential to be produced across the choke 33 as described previously. Similarly, recharging of the emergency reservoir is effected as described before via the valve 7.

In order that a typical manner of operation may readily be envisaged on the basis of the foregoing description, it may for example be visualized that the normal running brake pipe pressure may be 70 p.s.i. and the pressure responsive member of the service portion moves towards application of brakes when the brake pipe pressures falls below 0.75 p.s.i. of the auxiliary reservoir pressure. The service portion subsequently laps off to a stable lap position with brake cylinder valve closed when the brake pipe is at approximately auxiliary reservoir pressure.

The volumes may typically be so designed moreover that under service application conditions, a drop of brake pipe pressure of 20 p.s.i. will give a full service brake application of 50 p.s.i. brake cylinder pressure. Intermediate higher brake pipe pressures provide intermediate lower brake cylinder pressures.

Brake release under service application conditions is effected by a rise of brake pipe pressure of 1.5 p.s.i. above the auxiliary reservoir pressure, this being sufficient to cause downward movement of the pressure responsive member 1 from the lap position towards a position to open the brake cylinder exhaust valve.

If the rate of fall of brake pipe pressure on application conditions is sufficient and fast enough, the emergency portion operates with the service portion to enhance the brake cylinder pressure to produce an emergency brake application.

Typically the choke 63 and the check valve 57 of the emergency portion are so dimensioned that a drop of brake pipe pressure from 70 to 50 p.s.i. in 2 seconds will cause an emergency operation by opening vent valve 44 whereas a drop of from 70 to 50 p.s.i. in three seconds will cause only a service application. Additionally, small reductions of brake pipe pressure, of say 8 p.s.i. or less will not of themselves alone, however fast, effect the emergency portion.

After an emergency application, a reset time for the vent valve is arranged by choice of chokes 62 and 63, to be of the order of one minute. Additionally, recharge of the emergency portion is arranged to be fully effected from 0 to 70 p.s.i. via choke 64 in approximately 1 minute.

Having thus described my invention what I claim is:

1. Fluid operable brake control apparatus for controlling, in response to brake pipe pressure, the supply of fluid under pressure into and out of a brake cylinder, the apparatus including a first chamber at brake pipe pressure and a second chamber at reference pressure, a fluid pressure responsive member separating the first and second chambers, choke means between said chambers, a brake cylinder valve and a vent valve, the brake cylinder valve being connected between a fluid pressure reservoir and a brake cylinder port, the vent valve being connected between a brake pipe port and an exhaust port, means linking both said valves to the pressure responsive member so as to be opened by movement of the pressure responsive member when a fall of brake pipe pressure in relation to the reference pressure is sufficiently rapid as to not be compensated for by fluid flow in the choke means, and an accelerated release valve connected between the brake cylinder port and the brake pipe and so mechanically coupled to the pressure responsive member as to be opened when a recovery of brake pipe pressure in the first chamber beyond a reduced reference pressure in the second chamber takes place after reclosure of the brake cylinder valve and the vent valve.

2. Fluid operable brake control valve apparatus as claimed in claim 1, the vent valve, the brake cylinder valve and the accelerated release valve all being disposed in an in-line arrangement.

3. Fluid operable brake control valve apparatus as claimed in claim 2 wherein the accelerated release valve comprises a closure member and a seat which are movable as one in the closed position thereof, and the brake cylinder valve being operable by the pressure responsive member via an actuating rod and the movable accelerated release valve.

4. Fluid operable brake control valve apparatus as claimed in claim 3, further comprising resilient means for resiliently urging the accelerated release valve towards the closed position in the release position of the apparatus in order that it operates as a check valve during brake release operation and closes at a predetermined value of pressure difference between the brake pipe and the brake cylinder 5. Fluid operable brake control valve apparatus as claimed in claim 1 arranged and connected to operate as an emergency valve in combination with a service application controlling triple valve which is responsive to less than said predetermined change of brake pipe pressure.

* * * * *